E. G. BAUM.

BOTTLE CAP.

APPLICATION FILED JUNE 20, 1922.

Reissued Nov. 21, 1922. 15,491.

Inventor:

E. G. Baum by Wright Brown Quinby & Clay

Attys.

Reissued Nov. 21, 1922. Re. 15,491

UNITED STATES PATENT OFFICE.

EWALD GEORGE BAUM, OF NATICK, MASSACHUSETTS, ASSIGNOR TO BAUM DAIRY APPLIANCE COMPANY, OF NATICK, MASSACHUSETTS, A CORPORATION.

BOTTLE CAP.

Original No. 1,357,831, dated November 2, 1920, Serial No. 388,182, filed June 11, 1920. Application for reissue filed June 20, 1922. Serial No. 569,723.

*To all whom it may concern:*

Be it known that I, EWALD GEORGE BAUM, a citizen of the United States, and a resident of Natick, in the county of Middlesex and Commonwealth of Massachusetts, have invented certain new and useful Improvements in Bottle Caps, of which the following is a specification.

This invention relates to bottle caps and particularly refers to an improvement in a cap or closure for milk bottles.

The invention contemplates the production of a thorough sanitary leak-proof closure applicable to any standard milk bottle to reduce the possibility of contamination of the contents to a minimum.

In creating this closure particular attention has been paid to the formation of the mouth of standard milk bottles in order that the cap will function properly therewith without the necessity of modifying in any way its present form.

An important feature of the closure resides in the multiplicity of points at which it seals itself to the mouth of the bottle when applied, thereby insuring to the consumer a clean germ-proof staple, packaged to render the same impervious to dirt or filth.

A most serious objection to the form of caps now in use resides in the fact that many consumers are prone to remove the cap by pressing it inward, thereby permitting dust, dirt, or other filth to commingle with the contents. The construction of the cap according to this invention not only obviates but positively prevents the opening of the bottle by this method.

A further feature of the invention relates to the construction by which a partial vacuum may be formed between the lower face of the cap and the bottle contents, which not only insures expulsion of air beneath the cap but aids in holding it in position and maintains a firm sealing engagement between it and the bottle.

Another important characteristic of the cap is that when being removed after once being sealed the sealing faces are so distorted or destroyed as to effectually prevent its reuse.

With the above recited and other objects in view, some of which will be apparent from the following detailed description reference may be had to the accompanying drawings in which—

Figure 1:
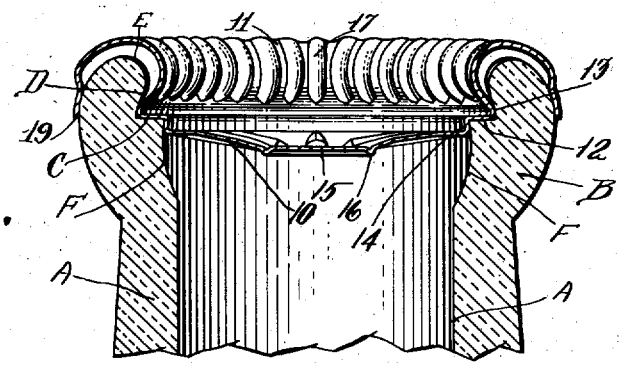
Figure 1 is a vertical sectional view through the improved cap illustrating its application to a standard milk bottle.
Figure 2:
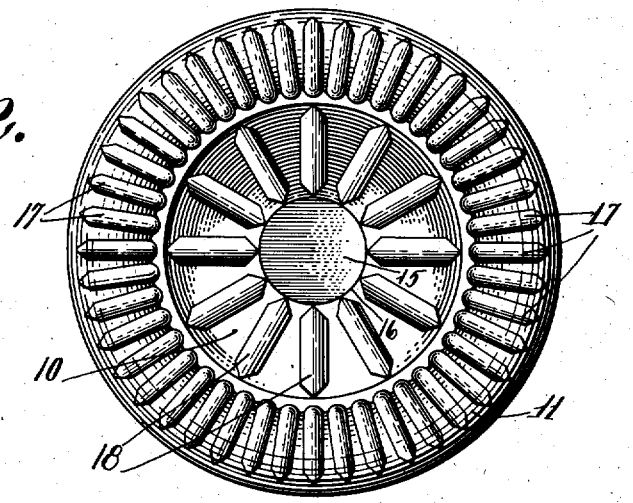
Figure 2 is a plan view thereof.

Referring to the drawings by characters of reference which denote like elements throughout the several views, A designates the neck of a standard milk bottle having the usual enlarged external bead B forming a pouring lip E. The bore of the neck is formed with a horizontal shoulder or ledge C constituting the seat for the usual form of cap, and the portion D of the bore lying between the shoulder C and the pouring lip E is frustoconical, the portion of larger diameter being immediately above the shoulder C. The portion F of the bore which communicates with the neck proper is of gradually increasing diameter toward its lower end for a short distance below the shoulder. The foregoing is a detailed description of the construction of the neck of a standard milk bottle and forms no part of the present invention.

The cap constituting the invention and designed as a closure for the bottle of the foregoing outlined construction is preferably constructed of compressed paper, pasteboard, or other suitable material, containing the necessary qualities to perform the functions for which it is intended. The cap is pressed, molded, cast, or otherwise formed of a piece of material to provide a bore-covering portion 10 and the pouring lip housing portion 11, the juncture of said portions being horizontally stepped to to provide the horizontal and substantially vertical annular sealing faces 12, 13, and 14 adapted for sealing engagement with the horizontal shoulder C and portions D and F of the bore. The internal diameter of the portion D of the bore is constant in all makes of bottles but there is a great variation in the form and curvature of the pouring lip and the diameter of the external bead B. The pouring lip housing 11 is therefore made to accommodate the maximum size of pouring lip E and bead B, and the material thereof is preferably formed with substantially radial integral corrugations or stiffening ribs extending over the top of the bottle pouring lip and terminating at opposite ends within the margin of the cap and above the sealing face 13. This construction causes the pouring lip housing to be resilient so that the marginal portion of the cap and the sealing face 13 may spring against the outer and inner faces, respectively, of the pouring lip below its largest diameter while elsewhere the housing may be out of contact with the lip. The cap is therefore equally applicable to bottles having considerable variation in the cross sectional contour of the pouring lip, the cap engaging and sealing against it along a pair of spaced annular surfaces on its inner and outer portions.

The central bore-covering portion 10 is provided with a concentric disk portion 15 bounded by a score 16, this score forming an annular corrugation in the portion 10, and a series of substantially radial corrugations 18 extend outwardly from this annular corrugation. These corrugations for the bore-covering portion define lines of flexure and expansion and contraction, the utility of which will later appear.

Figure 3:
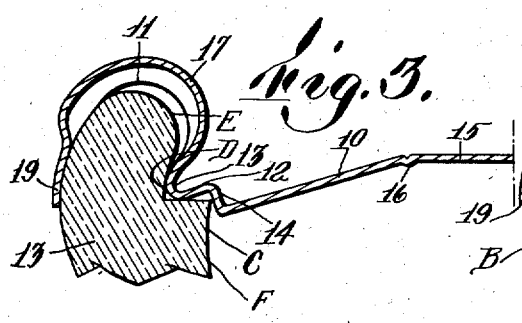
Figure 3 is a fragmentary diagrammatic view illustrating the condition of the cap when it is applied to the bottle.
Figure 4:
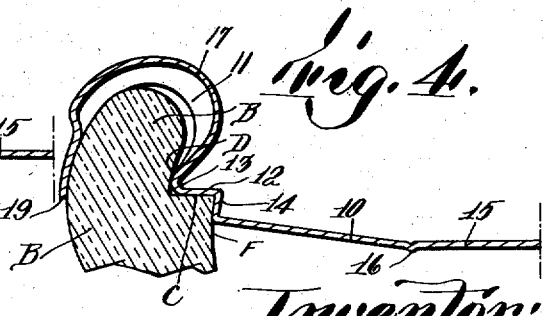
Figure 4 is a similar view illustrating the cap in sealed position.

When the cap is applied to the bottle, the central disk portion is positioned upwardly above the plane of the margin of the bore-covering portion 10 adjacent the sealing portion 14, as shown in Figure 3 and the sealing face 12 is seated on the shoulder C. This disk portion is then pressed downwardly below this plane to force out air from between the lower face of the cap and the upper surface of the milk, which is substantially at the level of the lower face 14, and the sealing faces 13 and 14 are pressed tightly into sealing engagement with the mating portions of the bottle. The corrugations 16 and 18 yield, by becoming more or less curved, as the alternate shrinking and expanding of the area of the bore-covering portion of the cap takes place as the disk first approaches and then passes below the plane of its margin, and the cap also flexes along these lines.

If considerable pressure has been applied downwardly on the central disk portion 40 to expel the air therebeneath, after the pressure is removed the elasticity of the bore-covering portion causes the disk portion to rise somewhat from its lowest position, thus creating a partial vacuum between the lower face of the cap and the surface of the milk, causing the cap to maintain sealing engagement with the bottle and to hold thereto with great tenacity.

When the cap is removed from the bottle, as by prying it up from the outside of the pouring lip, its sealing faces become so distorted or destroyed as to render it unfit for subsequent use as a sealing cap, which insures that only fresh sanitary caps may be used each time the bottles are filled and capped.

While there has been illustrated and described a single and preferred embodiment of the invention, no limitation is necessarily made to the precise structural details shown, as changes and modifications falling within the scope of the appended claims may be resorted to when desired without departing from the spirit or scope of this invention.

Having thus described my invention I claim as new and desire to secure by Letters Patent:

1. A bottle cap, including a bore-covering portion, and a pouring lip housing, the juncture therebetween being stepped to constitute a horizontal sealing face and upper and lower sealing faces adapted to respectively engage and coact with the horizontal seat and inclined bores of a milk bottle above and below said seat.

2. The combination with a milk bottle provided with an external bead, a pouring lip, an internal horizontal seat, and downwardly and outwardly flared walls above and below said seat, of a cap including a central bore-covering portion and an annular pouring lip housing formed about said bore-covering portion, the juncture of said portion and housing being stepped to provide a horizontal sealing face adapted to engage and coact with said seat, and superposed substantially vertical sealing faces adapted to coact respectively with said flared walls.

3. The combination with a milk bottle provided with an external bead, a pouring lip, an internal horizontal seat, and downwardly and outwardly flared walls above and below said seat, of a cap including a bore-covering portion and an annular pouring lip housing formed about said bore-covering portion, the juncture of said portion and housing being stepped to provide a horizontal sealing face adapted to engage and coact with said seat and superposed substantially vertical sealing faces adapted to coact respectively with said flared walls, said bore-covered portion being scored whereby it may be flexed relative to the plane of its margin.

4. The combination with a bottle provided with a neck formed with a central bore having a horizontal seat, frustoconical vertical walls immediately adjacent to said seat, one of said walls terminating in a pouring lip, of a cap adapted to be associated with said bottle neck and which comprises a central bore-covering portion and an outer pouring lip housing, the juncture therebetween being horizontally stepped to provide substantially vertical sealing faces and a horizontal sealing face connecting said vertical sealing faces.

5. The combination with a bottle provided with a neck formed with a central bore having a horizontal seat, frustoconical vertical walls immediately adjacent thereto, one of which walls terminates in a pouring lip, of a cap adapted to be associated therewith, which comprises a central bore-covering portion and an outer pouring lip housing, the juncture therebetween being horizontally stepped to provide superposed substantially vertical sealing faces and a horizontal sealing face connecting said vertical sealing faces, the bore-covering portion being axially shiftable.

6. A cap for a bottle having a bore terminating in a pouring lip, which comprises a central bore-closing portion, and a marginal pouring lip-embracing portion having corrugations extending over said pouring lip.

7. A cap for a bottle having a bore terminating in a pouring lip, which comprises a central bore-closing portion, and a marginal pouring lip-embracing portion provided with integral stiffening elements spacing said portion from the top of the lip.

8. A cap for a bottle having a bore terminating in a pouring lip, which comprises a central bore-closing portion, and a lip-embracing portion having substantially radial stiffening corrugations.

9. A cap for a bottle having a bore terminating in a pouring lip, which comprises a central bore-closing portion, and a lip-embracing portion having substantially radial stiffening ribs terminating within the margin of said cap.

10. A cap for a bottle having a bore terminating in a pouring lip, which comprises a central bore-closing portion, and a lip-embracing portion having substantially radial stiffening corrugations positioned over the top of said lip.

11. A cap for a bottle having a bore terminating in a pouring lip, which comprises a central bore-covering portion, and a lip-embracing portion surrounding said bore-covering portion and having substantially radial stiffening corrugations positioned over the top of said lip and terminating within the inner and outer margins of said lip-embracing portion.

12. A cap for a bottle having a bore provided with a horizontal seat, which comprises an annular portion for engagement with said seat, and a bore-covering portion depressed below said seat, said bore-covering portion having an annular corrugation therein.

13. A cap for a bottle having a bore provided with a horizontal seat, which comprises an annular portion for engagement with said seat, and a bore-covering portion depressed below said seat and having a central disk portion defined by an annular corrugation and radial corrugations extending outwardly therefrom.

14. A cap for a bottle having a bore provided with a substantially horizontal seat and a substantially vertical wall below said seat, which comprises an annular portion for engagement with said seat, and a bore-covering portion depressed below said seat, said bore-covering portion being expansible to permit its margin to be brought into sealing engagement with said vertical wall.

In testimony whereof I have affixed my signature.

EWALD GEORGE BAUM.